United States Patent [19]

Parrinello et al.

[11] Patent Number: 5,141,802

[45] Date of Patent: Aug. 25, 1992

[54] CHEMICALLY TREATED SHAPES, FILLERS AND REINFORCEMENT FOR POLYMER MATRICES

[75] Inventors: Luciano M. Parrinello, Allison Park; Narasimhan Raghupathi, Murrysville, both of Pa.

[73] Assignee: PPG Industries, Inc., Pittsburgh, Pa.

[21] Appl. No.: 655,256

[22] Filed: Feb. 13, 1991

Related U.S. Application Data

[63] Continuation of Ser. No. 219,700, Jul. 15, 1988, abandoned.

[51] Int. Cl.$^5$ .......................... D04H 1/58; B32B 9/00; D02G 3/00
[52] U.S. Cl. .................... 428/288; 428/290; 428/375; 428/378; 428/391; 428/392; 428/429; 525/132; 525/176
[58] Field of Search .............. 428/392, 391, 375, 378, 428/288, 290, 429; 525/132, 176

[56] References Cited

U.S. PATENT DOCUMENTS

| | | | |
|---|---|---|---|
| 3,597,265 | 8/1971 | Mecklenborg et al. | 117/126 GR |
| 4,029,623 | 6/1977 | Maaghal | 525/448 |
| 4,110,094 | 8/1978 | Motsinger | 65/3 C |
| 4,219,457 | 8/1980 | Taniguchi et al. | 260/38 |
| 4,246,145 | 1/1981 | Molinier et al. | 260/7.5 |
| 4,252,852 | 2/1981 | Goth | 428/336 |
| 4,291,095 | 9/1981 | Chase et al. | 428/391 |
| 4,338,234 | 7/1982 | Moore et al. | 523/206 |
| 4,358,501 | 11/1982 | Temple | 428/268 |
| 4,423,199 | 12/1983 | Chang et al. | 526/307 |
| 4,435,474 | 3/1984 | Das et al. | 428/391 |
| 4,450,197 | 5/1984 | Hager et al. | 428/232 |
| 4,461,804 | 7/1984 | Motsinger et al. | 428/288 |
| 4,473,950 | 10/1996 | Wong | 117/66 |
| 4,499,239 | 2/1985 | Murakami et al. | 525/176 |
| 4,507,342 | 3/1985 | Kielbania, Jr. | 428/90 |
| 4,518,653 | 5/1985 | McWilliams et al. | 428/378 |
| 4,551,382 | 11/1985 | Gagne et al. | 428/258 |
| 4,636,437 | 1/1987 | Algrim et al. | 428/391 |
| 4,752,527 | 6/1988 | Sanzero et al. | 428/391 |
| 4,753,980 | 6/1988 | Deyrup | 525/176 |
| 4,900,317 | 2/1989 | Chase et al. | 428/378 |

OTHER PUBLICATIONS

Product Bulletin "Experimental Emulsion E-693", Rohm and Haas Co.
Product Bulletin "Rhoplex TR-407 Acrylic Emulsion for Fiberfill", Rohm and Haas Company.
Product Bulletin "Rhoplex Acrylic Emulsions and Other Products for Nonwovens", Rohm and Haas Company.

*Primary Examiner*—Patrick J. Ryan
*Assistant Examiner*—Jill M. Gray
*Attorney, Agent, or Firm*—Kenneth J. Stachel

[57] ABSTRACT

Chemically treated glass shapes have a moisture-reduced residue of a chemical treating composition having: a first film forming polymer that is a thermoplastic polyester film forming polymer, a second film forming polymer that is an acrylic-type copolymer, at least one organosilane coupling agent selected from epoxy functional organosilane coupling agents and amino-functional organosilane coupling agents and mixtures thereof, at least one cationic lubricant and a carrier. The ratio of amounts of the first film forming polymer to the second film forming polymer is in the range of around 1:1 to 99:1. The chemically treated shapes can be in the form of beads, flakes, chopped or milled fibers, continuous fibers, strands, or bundles of fibers and yarn, and mats of continuous strand and/or chopped strand. The chemically treated glass fibers in mat form are paticularly suitable for reinforcing thermoplastic polyester polymers that are to be compression molded from the laminate of the polymer and the reinforcing material.

22 Claims, 2 Drawing Sheets

CHEMICALLY TREATED SHAPES, FILLERS AND REINFORCEMENT FOR POLYMER MATRICES

This application is a continuation of application Ser. No. 07/219,700, filed Jul. 15, 1988 is now abandoned.

The present invention is directed to chemically treated fillers of reinforcement shapes for polymeric matrices for reinforced polymer (RP) products. The shapes include fibers, bundles of fibers, strands and roving, flakes, beads and in general any shape of reinforcement material or of filler material for polymers. More particularly, the present invention is directed to chemically treated reinforcement or filler shapes for thermoplastic polyester-containing polymer matrices to produce RP products.

Polymer reinforcements and fillers constitute a major use of many fibrous, bead, and flake materials by the FRP (fiber reinforced plastics) industry. Glass fibers are a type of reinforcement and glass flakes and beads are types of filler materials for polymers in FRP. Typically, the production of glass fibers entails formation of a plurality of fibers from molten streams of glass at speeds up to around 15,000 feet per minute. The glass fibers require protection from intrafilament abrasion during their production and FRP products can benefit from improved compatibility between the fibers and/or fillers with their hydrophilic, smooth inorganic surfaces and the oleophilic organic polymers and resins. The use of chemical treatments applied to the fibers during their formation has provided some of this protection and compatibility for the fibers. Typically, the chemical treatments are aqueous solutions, emulsions, dispersions, foams, or gels having film forming polymers, coupling or keying agents, lubricants and possibly emulsifiers, wetting agents or processing aids.

Generally, for the fiber reinforced thermoplastic polymers, (FRTP) useful glass fibers include those of various shapes, sizes, configurations and chemical treatments. The glass fibers with the chemical treatments come in both chopped and continuous strand form from the gathering of a plurality of fibers into bundles or stands with or without subsequent chopping. The chopped strand can be used for injection molding and for compression molding, while the continuous strands can be used for compression molding. Also, chopped and/or continuous strand mats can be used where the mat has the construction of: loose, chopped or continuous strand, and/or intermingled and/or bonded chopped and/or continuous strands. The mechanical and/or chemical bonding of the strands in the mat provides the mat with some integrity between the strands. An example of a mechanically bound glass fiber strand mat is a needled mat of continuous strands, chopped glass fiber strands or a mixture thereof. An illustration of a continuous strand mat which is needled is that given in U.S. Pat. No. 4,335,176 (Baumann). The production and use of intermingled and/or bonded mats present considerations different from those presented by the production and use of entirely loose chopped or continuous strand mat.

Reinforcement of polymers with mats of continuous and/or chopped strands, where the strands are intermingled and/or bonded places several demands on the glass fibers comprising that mat. The strands must have good processability in producing the mat, and must permit good interfacial contact with the matrix polymer in the molded product. The processability of the strand into the mat involves: removing the strand from a source of the glass fiber strand, dispersing the strand into a mat, and intermingling or bonding some strands to each other. The good interfacial contact between the mat and the matrix polymer is best produced in a laminating operation that allows the polymer to flow into and around and through the mat and also by a molding operation that allows the mat to flow to conform to the configuration of the mold. The highest degree of interfacial contact between the matrix polymer and the mat is achieved when the thermoplastic polymer is in a melted state immediately prior and/or during the laminating and molding steps. This is especially the case for the higher molecular weight thermoplastic polymers.

Glass fiber reinforced thermoplastic polyester laminates such as polyethylene terephthalate (PET) and/or polybutylene terephthalate (PBT) require the use of sized glass fibers having good high temperature stability. This requirement is necessary since the PET and/or PBT (PET/PBT) is in an around the glass fibers in producing the heat close to or around melt during lamination or molding. This is a requirement even in using sized glass fibers for the laminates to be molded in a thermoforming molding process. Also, the requirement is necessary where the laminates are molded at temperatures above the melting temperature of the PET/PBT, and where any molded parts from the laminates will experience long term use in high temperature environments.

It is an object of the present invention to provide chemically treated glass or glass-like shapes for reinforcing or filling polymeric matrices where the treated shapes have good thermal stability especially when used with thermoplastic polyester polymers. It is a further object of the present invention to allow for good processability of the glass shapes into reinforcement or filler for the PET/PBT laminates and molded parts, while maintaining good physical properties.

SUMMARY OF THE INVENTION

The foregoing objects are accomplished by the chemically treated glass-like shapes of the present invention which have crystalline and/or amorphous poly(ethylene terephthalate) and/or poly(butylene terephthalate) homopolymers or copolymers (PET/PBT) with minor amounts of other copolymerizable materials and an effective reinforcing amount of chemically treated glass-like fibers or effective filling amount of chemically treated glass-like shapes. The chemically treated glass fibers or shapes have a moisture-reduced residue of a chemical treating composition that has: a first film forming polymer that is one or more aqueous soluble, dispersible or emulsifiable thermoplastic bisphenol A type polyester film forming polymers either alone or in a blend with an epoxy-containing film forming polymer; a second film forming polymer that is an acrylic-containing copolymer of at least one addition polymerizable acrylic-type monomer and at least one monomer that is addition polymerizable and matrix-resin miscible; an epoxy functional organo silane coupling agent or and an amino organo silane coupling agent or mixture thereof; and a cationic lubricant, and a carrier which is usually water. On a solids basis of film forming material in the chemical treating composition, the ratio of amounts of thermoplastic polyester film former to acrylic-containing copolymer film former is in the range of about 1:1 to around 99:1.

In one aspect of the present invention the application of the chemical treating composition to the glass-like shapes that are glass fibers occurs during the fiber formation process. Gathering of the chemically treated glass fibers produces bundles or strands of continuous glass fibers. These continuous bundles or strands can experience winding into a multilayered package of continuous bundles or strands or chopping into discrete lengths of chopped fibers. Either the continuous or chopped glass fiber strands or a mixture thereof can undergo formation into continuous or chopped mat or a combination of continuous and chopped mat. The mat formation occurs by depositing the glass fiber strands in chopped or continuous form on a moving conveyor so that a buildup of strands to a certain weight per length occurs on the conveyor. Additional processing of the mats can include chemically or mechanically binding the strands of the mat together for better mat integrity. Such mats find utility in reinforcing polymeric matrices, where the mat reinforcement and polymer matrix exist in a laminate form where compression molding shapes that laminate into desired structures and parts. The production of the laminate occurs by contacting the thermoplastic polyester material as a film, sheet, and/or extrudate with the chemically treated glass fibers in the form of chopped glass fiber strands, and/or continuous strands or mats of chopped glass fiber strands and/or continuous glass fiber strand wherein the mats can have intermingled strands and/or bonded strands. The contacting can occur under such conditions to have the melted thermoplastic intimately contact the chemically treated glass fibers under appropriate pressures. The compression molding of the laminate is through a molding operation such as thermoforming or in compression molding operation subsequent to heating of the laminate to a temperature above the melting point of the matrix polymer.

DETAILED DESCRIPTION OF THE INVENTION

By film forming material it is meant that upon removal of any solvents present in the polymer emulsion, dispersion, suspension or solution, the polymer can coalesce to form a film on the surface of the fibrous material. The term "glass-like" includes glass compositions formable into the desired shapes and inorganic oxide fibers and fillers such as silica, mica, talc, alumina, silicates, clays, calcium sulfate, magnesium sulfate and the like. Also as used herein, the term "shapes" includes fiberous materials like: one fiber, fibers, a bundle of fibers, strands, rovings and other collections of strands and fibers; and also includes other reinforcing materials and also polymer filling materials such as fibrils, flakes, beads and the like.

The chemically treated glass shapes of the present invention have the moisture-reduced residue, via air drying or drying in an elevated temperature, of a chemical treating composition (CTC) employing in addition to a carrier at least two film forming polymers along with at least one silane coupling agent, and at least one cationic lubricant. The combination of film formers can provide a coalescable but non-coalesced film on the glass shape with proper moisture-reduction of the treatment on the glass shape. Such a film can coalesce in subsequent processing when necessary to assist in producing glass-shape products such as continuous strand mat.

Figure 1:
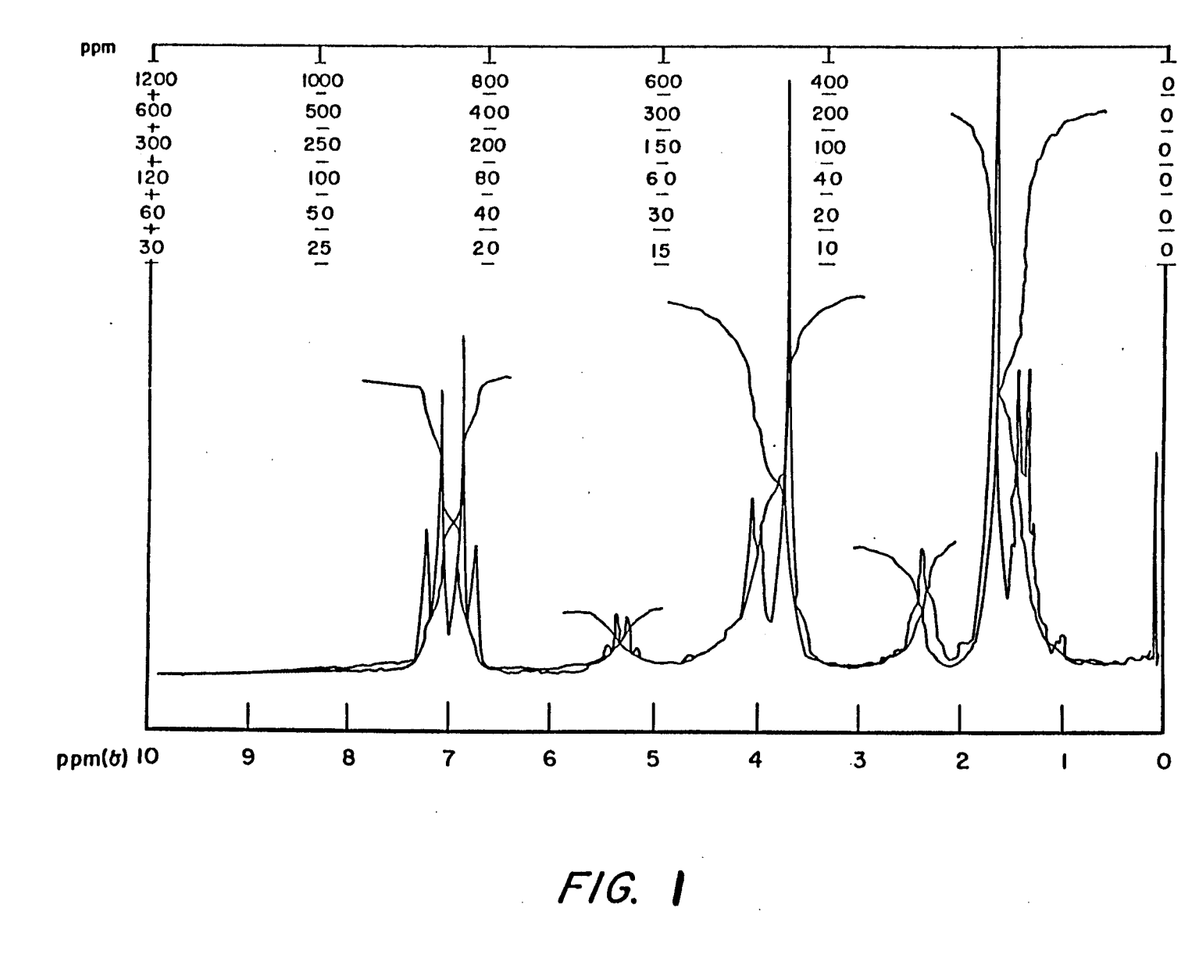
FIG. 1 is a nuclear magnetic resonance curve for an aqueous emulsion of a bisphenolic polyester resin which is commercially available under the trade designation Neoxil® 954 material from DSM Italia.

One of the film forming polymers is a water soluble, dispersible or emulsifiable thermoplastic bisphenol A polyester film forming polymer having polar functionality. A nonexclusive example of a suitable polar thermoplastic film forming polymer is an aqueous soluble, dispersible or emulsifiable bisphenol A polyester polymer like one formed from bisphenol A, butene diol or maleic anhydride or maleic acid and adipic acid with internal and/or external emulsification through the use of a polyalkylene polyol such as polyethylene glycol. Preferably, the polyester is internally emulsified through ethoxylation for a polymer with a weight average molecular weight in the range of about 30,000 to about 45,000 and has a polydispersity index $M_w/M_n$ of 9 or less and preferably around 5 to around 9 and has an equivalent viscosity of less than around 10,000 centipoise. An example of such a polymer is the single aqueous emulsion of alkoxylated bisphenol A polyester resin commercially available under the trade designation Neoxil® 954 and manufactured by DSM Italia, Como, Italy. The properties of the Neoxil® 954 resin are as follows: appearance—milky liquid, solids content—46±3%, pH—3–5, viscosity at 23° C.—2000±500 cps. Aliphatic unsaturation introduces into such a polymer by the butene diol or maleic anhydride or acid should result in aliphatic unsaturation of not more than 1.5 double bonds/mole of polymer. Also, the ratio of aliphatic unsaturation to aromatic unsaturation should be less than 0.1 and preferably around 0.07 or less. The amount of aliphatic unsaturation and the ratio can be controlled by any method known to those skilled in the art of polymerization. For example, the amounts of the various monomers can be controlled in the ratio of monomers with and without aliphatic unsaturation. An NMR curve for the Neoxil® 954 resin emulsion is shown in FIG. 1. The NMR was performed on a Varian EM-360 MHz proton NMR Spectrometer with a sweep time of 5 minutes and sweep width of 10 ppm and an end of sweep of 0 ppm and a zero reference of tetramethylsilane (TMS) and an ambient sample temperature and with $CDCl_3$ solvent. The amount of the polar thermoplastic film forming polymer in the aqueous CTC can be in the range of about 1 to about 20 weight percent of the solids of the aqueous CTC.

Additional nonexclusive examples of bisphenol A polyester resins are those available in an aqueous emulsion form under the trade designation Neoxil® 952 from DSM Italia. The aqueous emulsion of the Neoxil® 952 material is an anionic emulsion that has a liquid, milky appearance with a solid content of 40 ±2 percent and a pH in the range of 4 to 5. The viscosity at 23° C. is 40 to 100 centipoise and the lowest pH threshold value of the thinned emulsion (8 percent solids content) is 4. The Neoxil® 952 material is very soluble in styrene and compatible with polyester resins. Another example of the film forming polymer is a high molecular weight saturated epoxy ester which is water soluble, emulsifiable or dispersible. Commercially available high molecular weight saturated epoxy ester in a water emulsion is available from DSM Italia Company under the trade designation Neoxil ® 961 material. This material is a nonionic emulsion having a liquid milky appearance and a solids content of 30 ±2 percent and a pH in the range of 4 to 5.5 with a viscosity at 23° C. of 200 to 500 centipoise and the solid resin has a hydroxyl number of 100 ±10, an acid number of 10 ±2 and an epoxy equivalent of 9,000 ±1,000. Generally, any of the bisphenol A type polyester resins which are soluble, emulsifiable or dispersible in water with anionic, nonionic or cationic emulsifiers can be used especially if their amount of unsaturation is not greater than 1.5 and their unsaturation ratio is less than 0.1. Also, generally, any esterified epoxy resin which is water soluble, emulsifiable or dispersible by anionic, nonionic or cationic emulsifiers can be used as the polar thermoplastic film forming polymer, especially wherein the amount of unsaturation and ratio are controlled.

The aqueous soluble, dispersible or emulsifiable polyester and/or epoxy-containing polymer can have an emulsion or dispersion produced with any suitable surfactant known to those skilled in the art. In preparing a single emulsion having a blended epoxy-containing polymer and polyester film forming polymer or separate emulsion of each polymer, any nonionic, cationic, anionic or amphoteric emulsifying agents can be used. It is preferred to use nonionic emulsifying agents having an HLB in the range to match the ionic character of the blended polyerms. For example, one or more surfactants which are condensates of ethylene oxide with hydrophobic bases formed by condensation with propylene oxide with propylene glycol can be used. For example, the Pluronic ® F-108 surfactant manufactured by BASF Wyandotte Industrial Chemical Group can be used to form a suitable emulsion or dispersion.

The CTC also has present another film forming polymer that is an additional polymerized copolymer of at least one acrylic-type monomer and an addition polymerizable monomer that is also matrix-resin miscible (hereinafter "Addition Polymerizable Comonomer"). Hereinafter the term "acrylic-type copolymer" refers to the addition polymerized copolymer. The term "acrylic-type" for the at least one type of monomer used in preparing the copolymer refers to acrylic monomers having the formula:

(Formula 1)

wherein X is a hydrogen atom or a methyl or other lower alkyl group, and Y is selected from one of the following groups: —COOH; —COOR' —COOROH, wherein in both instances R represents a hydrocarbon radical and/or hydroxymethyl and/or hydroxyalkyl or alkoxyalkyl radicals having from about 1 to about 20 carbon atoms. Also, the acrylic-type monomer can be a plurality of the aforementioned acrylic monomers to achieve a more thermally stable copolymer by using such a blend or mixture of the monomers to increase the critical temperature for the copolymer.

The Addition Polymerizable Comonomer is a copolymerizable monomer with one or more acrylic monomers and is an ethylenically unsaturated monomer, nonexclusive examples of which include: a) compounds having the formula CH$_2$═CQZ (Formula 2) wherein 'Q' is a hydrogen atom or methyl and 'Z' is selected from (—C≡N) or any nitrile-containing monomers with ethylenic unsaturation such as acrylonitriles and methacrylonitrile and the like, or b) epoxy-containing monomers with ethylenic unsaturation like glycidylacrylate and/or glycidylmethacrylate and the like where in formula (2) 'Z' would be Additional different copolymerizable monomers can be present such as styrene, butadiene, vinyl toluene and alpha-methyl stryene.

Generally, the aqueous or oil-in-water emulsion or dispersion of the copolymer is formed by the copolymerization of a mixture of about 10 to about 99 parts by weight of at least one of the acrylic-type monomers and about 1 to about 90 parts by weight based on the total monomer mixture of the Addition Polymerizable Comonomer. The copolymer can be produced into an aqueous emulsion by any addition polymerization methods known to those skilled in the art such as bulk, emulsion, suspension, solution and slurry polymerization either by a free-radical or an anionic mechanism or by electrolysis preparation. For instance, a 75/27 methacrylate- acrylonitrile copolymer aqueous emulsion is prepared by the emulsion copolymerization by emulsifying the monomers with an anionic, cationic or nonionic dispersing agent of about 0.5 to about 6 percent. To such a mixture a polymerization initiator of the free radical type such as ammonium or potassium persulfate is introduced alone or in conjunction with an accelerator such as potassium metabisulfite or sodium thiosulfate. These catalysts may be used in proportions of 0.5 to 2 percent each based on the weight of the monomers to be copolymerized. Reaction temperature may be from room temperature to 60° C. or more. Suitable anionic dispersing agents including the sodium salts of the higher fatty acid sulfates such as that of lauryl alcohol and the like or any of the nonionic type such as ethylene oxide modified alkyl phenols can be used.

A suitable example of the copolymer is that available from Rohm & Haas Co., Philadelphia, Pa., under the trade designation Rhoplex E-693 material. This material is a white emulsion having a solids content of 49.5 to 50.5 percent with a pH of 4.5 to 6.5 and a viscosity at LVT (1), 60 rpm 20-60. This copolymer is a self-crosslinking acrylic-type copolymer of the anionic emulsifying type with a density at 20° C. of 8.8 pounds per gallon and a minimum film forming temperature of +12° C. and a "temperature 300° C. (T°300) of 24° C. which is the temperature at which the torsional modulus of an air dried film is 300 kilograms per centimeter$^2$ and which is a relative parameter of film stiffness with the lower T°300 values indicating softer polymers.

Figure 2:
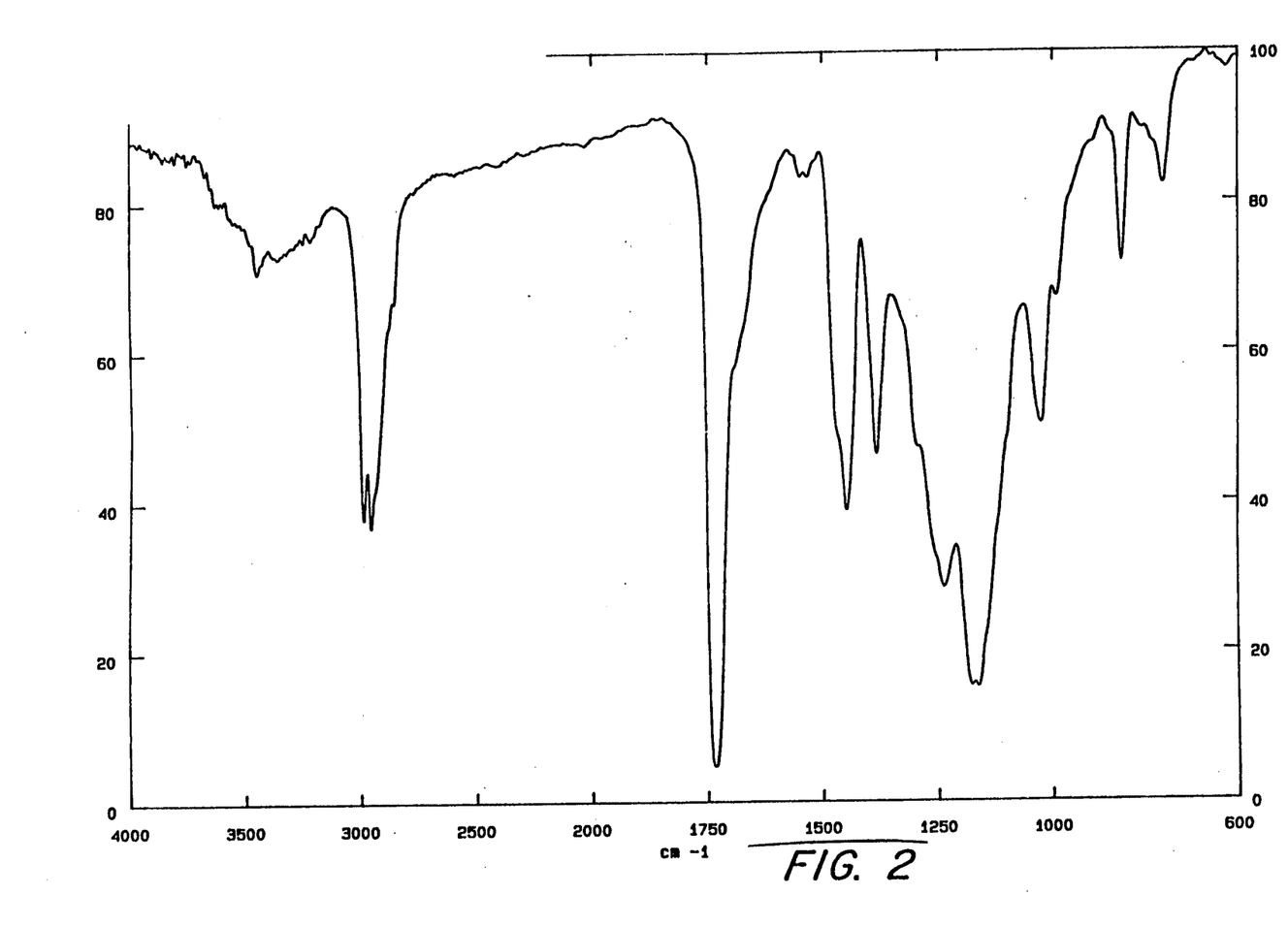
FIG. 2 is an infrared spectrophotometric graph of the Rhoplex TR-407 acrylic-containing copolymer emulsion useful as a component in the chemical treating composition for the chemically treated glass-like shapes and fibers of the present invention.

Another suitable example of and the preferred acrylic-type copolymer emulsion is that available from Rohm & Haas under the trade designation Rhoplex TR-407 material having the infrared curve of FIG. 2. This anionic emulsion has a 45.5 weight percent solids and a pH of 3.5 and a density of 8.9 pounds per U.S. gallon and a specific gravity of 1.07 with a viscosity of 30 centipoise and a T°300 of +30. The appearance of the emulsion is a milky-white liquid that has a minimum film formation temperature of +22° C. and is a self-crosslinking emulsion, which is the preferred acrylic-type copolymer in the present invention. Generally, any acrylic-type copolymer can be used which gives a film having a hand ranging from intermediate to firm. Another nonexclusive example in the Rhoplex AH-20 acrylic emulsion.

The ratio of amounts of the two film formers present in the CTC ranges broadly from around 1:1 to 99:1 and preferably from around 70:30 to around 95:5 of the thermoplastic polyester to the acrylic-type copolymer on a solids basis of the total amount of the two film forming polymers. With increasing amounts of the acrylic-type copolymer in excess of 25 to 30 weight percent of the total film forming polymer increased fuzzing and increased inability to maintain moisture occurs for the chemically treated glass fibers. The increased fuzzing can cause processing problems for chemically treated glass fibers or strands, and these problems should be remedied by appropriate use of proper additives known to those skilled in the art. It is most preferred when treating fibers that the amount of the acrylic-type copolymer does not exceed around 25 weight percent of the solids of the two film forming polymers. Also, the blend of the two film formers should result in a glass transition temperature for the blend that is at least around room temperature. For example, the acrylic-type copolymer preferably has a Tg in the range of around 32° to 36° C. which, when blended with the Neoxil 954 polyester results in a Tg of the blend around room temperature. Preferably, the total amount of film forming polymer in the CTC is generally in the range of 65 to 90 weight percent of the solids of the CTC. Preferably with this total amount of film forming polymer the amount of the thermoplastic bisphenol polyester film former is in the range of about 55 to 70 weight percent of solids of the aqueous CTC and the acrylic-containing copolymer has an amount in the range of around 10 to around 20 weight percent of the solids of the aqueous CTC.

In addition to the aqueous soluble, dispersible or emulsifiable film forming polymer, the aqueous CTC also has present one or more epoxy-containing organofunctional coupling agents and/or amino-containing organofunctional coupling agents. The coupling agents can be organoalkoxy silane compounds or organofunctional Werner compounds and the like having one or more epoxy moieties on the organofunctional portion of the molecule.

The epoxy-containing, organofunctional alkoxy silane coupling agents that are used have a formula such as:

where $R^1$ is a lower alkyl group or hydrogen to make (OR') a water hydrolyzable group such as hydroxyl, halogen, alkoxyl, preferably having one to five carbon atoms and acryloxy, where x is an integer from 1 to 3, and where y is an integer from 1 to 6. Representative examples of the epoxy silanes include beta-hydroxyethyltriethoxysilane, gamma-hydroxybutyltrimethoxysilane; 2,3-epoxypropyltrimethoxysilane; 3,4-epoxybutyltriethoxysilane; bis-(2,3-epoxypropyl)dimethoxysilane; glycidoxypropyltrimethoxysilane; and 3,4-epoxycyclohexyltriethoxysilane.

The aminoorganoalkoxy silane coupling agent can be selected from the group of monoamino and diamino organoalkoxy silanes. In addition, there may be present a lubricant modified aminoorganoalkoxy silane coupling agent where the lubricant is a standard textile lubricant known to those skilled in the art. Both of these types of silane coupling agents, with monoamino functionality can be designated by the general formula:

wherein: R is an alkylene radical having from 2 to 8 carbon atoms and $R^1$ is a lower alkyl radical or hydrogen; the lower alkyl radical having 1 to 5 carbon atoms, preferably having 1 to 2 carbon atoms. Nonexclusive example of amino silanes include gamma-aminopropyltriethoxysilane, N-(trimethoxy silylpropyl)ethane diamine acrylamide, aminomethyltriethoxysilane, aminopropyltrimethoxysilane, diaminopropyldiethoxysilane, triaminopropylethoxysilane.

A number of other silanes containing at least one organic group substituted by one or more amino groups or epoxy groups may also be used in the practice of the present invention, and these silanes are well known to those skilled in the art. As will be appreciated by those skilled in the art, the aforementioned silane coupling agents can be used as the silane coupling agent or its partial or full hydrolysis products (silanol) or its polymerization product (polysiloxane). The amount of the silane coupling agent present in the aqueous CTC is in the range of about 0.1 to about 2 weight percent of the aqueous CTC or about 2 to about 35 weight percent of the nonaqueous (solids) components of the CTC.

A mixture of the epoxy-functional organoalkoxysilane and amine-functional organoalkoxysilane coupling agents is also an acceptable alternative. The mixture contains from around at least 20 weight percent epoxy-organofunctional silane but, preferably, the epoxy-organofunctional silane is in a predominant amount.

In addition to the foregoing components of the aqueous CTC, there is a cationic lubricant in an effective lubricating amount. The lubricants are those that are cationic in nature and which impart lubricity to the glass fibers and gathered bundles of glass fibers and strands. Examples include acid solubilized, fatty acids amides such as stearic amide. The fatty acid amides are both saturated and unsaturated and the acid group contains from 4 to 24 carbon atoms. Also, anhydrous acid solubilized polymers of the lower molecular weight unsaturated fatty acid amides are included. Also included are the alkyl imidazolines, which are formed by reaction of fatty acids with polyalkylene polyamines under conditions to produce ring closure. A particularly suitable cationic lubricant is a polyamino amide material having an amine value of about 200 to 800 that is preferably prepared by using fatty acids at least one of which is pelargonic acid. Also, this material can be solubilized further with acetic acid. A nonexclusive example of such a material is the polyalkyleneimine partially amidated with fatty acid like pelargonic acid that is commercially available from Emery Industries, Inc. under the trade designation Emerylube® 6717. This material is a viscous liquid with a point of 55, a density in lbs/gallon of 8.3, a Gardner color of 10, a cloud point of less than 25° C., a flash point of 540° F. (282° C.) and is soluble in water and dispersible in mineral oil. Another suitable material is manufactured under the trade designation Cirrasol® 185A which is an anhydrous material with a deep reddish amber color which is a viscous liquid at room temperature. It is water dispersible and a one percent solution has a pH of about 8.9 to about 9.4. When the glass fiber lubricant contains a reactable nitrogen group, the effective amount of the lubricant should be limited to substantially prevent any crosslinking of any epoxy-containing polymer that may be present by the nitrogen-containing groups of the glass fiber lubricant. Generally, the effective amount of the glass fiber cationic lubricant is in the range of about 0.05 to about 0.5 weight percent of the aqueous CTC or in the range of around 1 to around 6 weight percent solids of the aqueous CTC.

Although other additional film forming polymers, coupling agents, lubricants, processing aids and thickeners can be employed in the aqueous CTC of the present invention, the aqueous CTC is essentially free of several different types of materials. One such material is any epoxy curing agents, whose sole function would be to crosslink any epoxy-containing polymer or copolymer. Preferably, the other materials that are essentially absent are those that would not be solubilizable in the polyester film forming polymer or acrylic-type copolymer or in the blend of epoxy-containing polymer or copolymer and polyester film-forming polymer. Such a material is the nonionic water insoluble hydrocarbon glass fiber lubricants such as hydrogenated hydrocarbon oil. Typically, the water insoluble lubricant is a hydrogenated or saturated fatty acid ester of glycerol. Also, preferably essentially absent are hygroscopic components that might attract and retain moisture in high humidity environments.

The CTC also has a carrier in sufficient amount to give a total solids for the composition that is sufficient to enable the glass fibers to be treated during their formation with the aqueous, gel, or foam chemical treating composition. Generally, the total solids of the aqueous CTC is in the range of about 1 to about 30 weight percent and preferably about 2 to about 10 percent. In all events, the amounts of the solid components should not exceed that amount which will cause the viscosity of the aqueous CTC to be greater than about 100 centipoise at 20° C. Viscosities greater than 100 centipoise at 20° C. make it difficult to treat glass fibers during their formation without breaking the fibers. It is preferred that the viscosity be between 1 and 20 centipoise at 20° C. for best results. When the CTC has thixotropic gelling or forming agents, viscosities are used that are known for gels and foams used to treat glass fibers. The pH of the aqueous CTC is below about 7, and preferably should be in a range of around 4.5 to around about 5 to maintain the stability of the composition. The aqueous CTC can be made by combining the components simultaneously or sequentially.

Application of the aqueous CTC to the glass fibers occurs by any method known to those skilled in the art. For instance, during the formation of the glass fibers, application is after the glass fibers have cooled to a sufficient temperature to allow the application of the aqueous CTC. The aqueous CTC, typically referred to as a sizing composition, is applied to these glass fibers by applicators having belts, rollers, sprays and the like. The treated glass fibers can be gathered into one or more strands and collected into a package commonly referred to as a forming package. Also, the glass fibers can be collected into one or more strands and chopped as a wet chopped product. Also, the glass fibers can be gathered into one or more strands and collected as a roving. The glass fibers in any form are dried to reduce their moisture content. Drying can occur at temperature and time conditions equivalent to a range from ambient drying to drying at a temperature in the range of about 135° F. (121° C.) to less than 300° F. (149° C.) for around 4 to around 11 hours. Generally, higher temperatures in the range involve lower heating times in the range. Preferably, for producing needled mat with coarser fibers around 27 microns or greater, the glass fibers are dried at conditions of lower temperatures and times in the aforementioned ranges. For instance, in this case, drying can occur at a temperature of around 155° F.–165° F. for 5 to 7 hours to produce non-coalesced moisture-reduced residue on the fibers. When the strands are air dried, the moisture content is in the range of around 8 percent or less and more particularly, around 4 to 6 percent. For oven dried strands, the moisture content is generally around two to around 4 weight percent. For the finer fibers the drying conditions of temperature and time can be at higher values in the above-stated ranges especially when it is not necessary to form a non-coalesced film. The drying can be accomplished in any conventional glass fiber drying oven such as forced air ovens, dielectric ovens, and the like. The dried glass fibers have a dried residue of the aqueous chemical treating composition present on the surface of the glass fibers making up the strands. Preferably, the amount of moisture-reduced residue on the glass fibers is in the range of around 2.5 to around 4 weight percent LOI (loss on ignition).

The moisture-reduced glass fiber strands in the chopped and/or continuous mat form contribute useful reinforcement properties to polymers. The mats can be made by any method known to those skilled in the art. Particularly suitable mats have bonded or intermingled strands effected by either mechanical or chemical bonding. The mats are generally constructed by distributing the chopped and/or continuous glass fiber strands in a fashion to prepare a desired weight per length of the strands. One such method is to distribute the glass fiber strands across a moving conveyor belt on which the mat is collected. When the strands of the mat are to be bonded or intermingled, the mat is contacted with a chemical bonding agent, for instance, in the form of a spray over the mat or is contacted with a needler. Such a needling device and process is shown in U.S. Pat. Nos. 4,277,531 in FIG. 1 and 4,692,375 hereby incorporated by reference. Also, the process for traversing the glass fiber strand can be any process known to those skilled in the art, one example of which is U.S. Pat. No. 3,915,681, hereby incorporated for showing the traversing of the glass fiber strands to form a mat. Where continuous strand mat is formed utilizing belt strand feeders, it is preferred to pretreat the strand with water. This is accomplished by water sprays or kiss roll applicators. Also, the mats can be formed directly in the process of forming the glass fibers as is shown in U.S. Pat. No. 4,158,557, hereby incorporated by reference. By this letter method the glass fiber strands would not be collected into forming packages and dried but they are conveyed directly to a traversing distributor to place the glass fiber strands into a mat form on a moving conveyor belt.

In the laminates of the present invention, the glass fibers reinforce the PET/PBT polymer, where the PET/PBT polymer in the laminate or in the final molded part is to be in amorphous, crystalline, or semi-crystalline form. The PET/PBT which is virgin or recycled PET/PBT may have agents or may have been treated to increase the rate of crystallization of the PET/PBT. The PET/PBT can be prepared by any method known to those skilled in the art such as bulk or solution techniques from copolymers of vinyl aromatic compounds and/or alpha-beta unsaturated cyclic anhydrides, and rubber modified copolymers where the rubber is grafted or blended. The PET/PBT can also be in the form of copolymers with minor amounts of other copolymerizable materials, for instance, about 0 to 30 mole percent of sebacate, and/or azelate copolymers or block copolymers with poly(ethylene oxide). Also, the PET/PBT can be in substantially amorphous form with 0 to 18 percent crystallinity and weight average molecular weights ranging from 5,000 to 60,000.

It is preferred to utilize PBT which has a rate of crystallization so that the PBT can be stamped into parts at temperatures of around 130° to 210° C. in a time of about 20 to 60 seconds to result in stamped parts having a range of crystallinity of at least 30 to 50 weight percent. The PBT is moldable by injection molding, extrusion molding or compression molding and any of these moldable PBTs known to those skilled in the art can be used.

For PET any method known to those skilled in the art can be used for increasing the rate of crystallization. For example, such methods include: decreasing the molecular weight or inherent viscosity of the PET to increase the rate of crystallization, altering the structure of the PET to be a random or blocked copolymer, utilizing higher amounts of comonomer to produce the PET, increasing the rate of diffusion within the melt by adding lubricants to the PET melt, adding organic or inorganic nucleating agents, maintaining catalyst residue of insoluble catalysts within the PET where the catalyst was used to produce the PET and utilizing the PET, with a prior thermal history to have a strong nucleating effect to increase the rate of crystallization at temperatures below 280° C.

In addition, the PBT polymer can have present agents to improve resistance to cracking due to shrinkage or crystallization, rubbers of polyolefins to improve impact strength, agents to improve impact resistance, coloring agents, ultraviolet and heat stabilizing agents, opacifying agents, thermo-oxidative stabilizers like esterically hindered phenols and phenolic derivatives and fire retardants.

The laminate has the glass fiber strands in any form in an amount of about 5 to about 200 parts by weight per 100 parts by weight of the PBT. The laminate is formed by contacting the glass fibers in any form with the PET/PBT; for example, chopped glass fiber strands are contacted with the PET/PBT in an injection molding, extrusion molding or compression molding operation to form the laminate. In injection molding and extrusion molding, the chopped glass fibers are intimately dispersed in the PET/PBT and the laminate is formed as an injection blank or extrusion blank for further molding operations. The continuous glass fiber strands are usually in the form of mats, where one or more plys of mat are contacted with one or more plys of PET/PBT to form a laminate on a laminating line for subsequent compression molding or thermoforming or cold molding.

To form the laminate for compression molding, one or more mats of glass fibers strands, preferably dried, needled mats, are fed to a laminator. One or more resin overlays are passed with the mats. Also, a resin extrudate or film or sheet can be placed between the mats before they are compressed by the belts of the laminator. The extrudate is typically in the form of a layer of resin across the width of the mats and is constantly delivered to the system from an extruder die. It is possible just to have an extrudate pass between the mats or between the mats and over the mats. The overlays and mats and extrudate are laminated typically by applying pressure to them at elevated temperatures. The temperatures are maintained sufficiently high to insure the overlay sheets become molten. Residence times are not critical but should be long enough to insure that the resins thoroughly impregnate the mats. The thoroughly impregnated resin-glass laminate is then cooled usually while maintaining pressure on the laminate until the resin solidifies. The resulting product is a sheet of resin having a mat underneath both of its major surfaces. It is possible to use multiple layers of mats and resin where some of the mats can be chopped glass fiber strand mats as shown in U.S. Pat. No. 3,684,645 (Temple) hereby incorporated by reference. The laminate is prepared with overlay sheets but laminates may also be prepared using extrudate alone. It is also possible to use an extruder with mulitple dyes or multiple extruders to provide the layers of extrudate, on each side and in between the mats and the third in the center of the mats.

The laminate can be molded by any process known to those skilled in the art for molding PET and/or PBT and especially by any known compression molding process. For instance, thermoforming can be used where the laminate is made with PET in the amorphous or substantially amorphous state. With the laminate made of crystalline PET/PBT, molding is conducted in any fashion known to those skilled in the art; one example of which shown in U.S. Pat. Nos. 3,621,092 and 3,626,053 hereby incorporated by reference.

PREFERRED EMBODIMENT OF THE INVENTION

In the preferred embodiment of the present invention, calcium aluminum borosilicate glass fibers ("E-glass or "621-glass") are attenuated from molten batch. The glass fibers are coated with the aqueous CTC during the formation of the glass fibers from a multitude of orifices in a bushing of a glass-melting furnace by a belt type binder applicator.

The aqueous CTC has a aqueous emulsion having bisphenol polyester film forming polymer available from DSM Italia under the trade designation Neoxil ® 954 as a polymeric material for film formation. Also present in the acrylic-type copolymer that is the Rhoplex TR-407 emulsion. The ratio of amounts of the polyester to acrylic type copolymer film formers is around 80:20 on a solids basis for the total amount of film forming polymer. The total amount of film forming polymer is preferably in the range of around 70 to around 85 weight percent of the chemical treating composition. The water which is present to make up the aqueous CTC is that amount to give a total solids content preferable around 5 to 6 weight percent of the aqueous chemical treating composition. The total amount of the film forming polymers is the remainder of the solids from the amounts of the coupling agent and lubricant. The pH of the aqueous chemical treating composition is preferably in the range of about 4 to about 6.

The aqueous CTC is prepared by hydrolyzing the gamma glycidoxypropyltrimethoxy silane with acetic acid in an amount of about 1 milliliter of acetic acid for about 20 grams of the silane in a premix tank. The hydrolyzation is preformed by adding the acetic acid to about 10 to 20 weight percent of the water to be used in preparing the CTC and adding the silane to this mixture with stirring until complete hydrolyzation occurs. The cationic glass fiber lubricant is added to hot water 170° F. (76.7° C.) with stirring where the amount of water is about 1 percent of the total amount of water used in preparing the aqueous CTC in a premix tank. The aqueous emulsion of the bisphenol polyester as about 46 percent solids is added to a main mix tank and stirred. The aqueous emulsion of acrylic-type copolymer is added to the main mix tank and stirred. The hydrolyzed silane and glass fiber lubricant are added to the main mix tank. A small amount of antifoaming agent like SAG 10 can be added before or after the mix which has been agitated and diluted to the final desired volume with water. The final pH of the aqueous CTC is then adjusted to be in the range of about 4 to about 6 with a compatible organic acid such as acetic acid.

The glass fibers have any diameter known to those skilled in the art, but generally fiber diameters can range from about $10.3 \times 10^{-5}$ to about $120 \times 10^{-5}$ inch or more. The application of the aqueous CTC to the glass fibers gives an add-on of the chemical treating composition in the range of about 0.5 to about 1 percent LOI (Loss on Ignition). The glass fibers, which are usually G, K, or T-fibers, depending on the ultimate use of the laminate, are gathered into strands. The strands of glass fibers are collected on a winder to produce a forming package and a plurality of the forming packages are dried in a Michigan oven at a temperature in the range of about 135° to 170° F. (57°–77° C.) for 4 to 10 hours for the coarser glass fibers to reduce the moisture content of the strand on average to be in the range of around 2.5 to around 4.0 weight percent of the package.

Dried glass fiber strands are aged by storing at conditions ranging from ambient conditions up to elevated temperatures of around 70° to 80° F. (21°–27° C.) for up to three days. These aged strands are conveyed over a kiss roll for application of water to a traversing distributor or feeder to be projected downwardly into a moving conveyor, preferably a wire neck chain, for example, as shown in U.S. Pat. No. 4,615,717 hereby incorporated by reference. The strands are traversed across the width of the conveyor on a continuous basis to cover the conveyor with glass fiber strands. The mat is layered by the plurality of strands to a desired weight/length of around 3 oz/ft and typically contain some moisture (U.S. Pat. No. 4,404,717). The mat of dried strands is conveyed to a needler such as that shown in U.S. Pat. No. 4,404,717, hereby incorporated by reference and is needled. If the mat contains 5 to 15 percent by weight moisture, it is fed continuously to the oven, where air is at a temperature between 70° F. to 120° F. in the oven to dry the mat. The mat leaving the oven or the mat of previously dried strands has a substantially reduced moisture content of about 2 percent or less on a weight of the mat. If necessary, air at 70° F. to 120° F. is passed across the width of the mat to reduce the moisture content of the mat further and to provide a mat entering the needler at a moisture content of about 0.5 to 1 percent. The needler has an environment controlled at 70 to 120° F. and a low relative humidity below 60 percent. The continuous strand mat is needled and emerges at a final moisture content of 0.3 percent or less.

The continuous glass fiber strand mats which are needled is the manner described typically emerge from the needler in a cohesive state and have sufficient mechanical integrity that they can be handled without distorting their generally flat shape. Characteristically, they contain two major surfaces, two side edges and a leading edge. The trailing edge of the mat is provided when the mat is cut after reaching a desired length. In a typical manufacturing process continuous strand mat is formed continuously and fed through the needling machine continuously. It is folded in boxes for use in laminating or rolled into large rolls for the same purpose at convenient lengths.

The present invention is further illustrated without limiting the scope of the invention by the following examples.

Four examples of the chemical treating composition and two illustrative examples (Ill. Eg.) of CTC outside the scope of the invention are presented in Table 1. The preparation of the compositions for Examples 1–4 was similar to that described in the preferred embodiment. The preparation of the compositions of the illustrative examples was also similar to that of the preferred embodiment except the material indicated as absent in the illustrative examples was not added at the time specified in the preferred embodiment. Examples 1–4 show the range of the ratio of the two film forming polymers, the polyester-type film forming polymer and the acrylic-type copolymer film former possible for the aqueous CTC.

TABLE 1

| | | Chemical Treatments for Glass | | | | | |
|---|---|---|---|---|---|---|---|
| Components | % Solids | Ill Eg 1 gm | Ill Eg 2 gm | Eg 1 gm | Eg 2 gm | Eg 3 gm | Eg 4 gm |
| -glycidoxypropyl-trimethoxysilane (Z6040) from Dow Corning Co. | 80 | 26.08 | 26.08 | 26.08 | 26.08 | 26.08 | 26.08 |
| acetic acid | 100 | 1.5 | 1.5 | 1.5 | 1.5 | 1.5 | 1.5 |
| partially amidated poly-alkyleneimine cationic lubricant (Emery 6717) | 100 | 3.03 | 3.03 | 3.03 | 3.03 | 3.03 | 3.03 |
| aqueous dispersion of bisphenol A polyester film forming polymer (Neoxil ® 954) | 46 | 130.61 | 0 | 111.02 | 97.96 | 84.90 | 65.31 |
| aqueous dispersion of acrylic copolymer film forming polymer (Rhoplex 407) | 46 | — | 130.61 | 19.59 | 32.65 | 45.71 | 65.31 |
| Ratio of film formers polyester/acrylic copolymer | — | — | — | 85/15 | 75/25 | 65/35 | 50/50 |
| water to dilute to | | | | 75.7 Liters | | | |

TABLE 1-continued

| | | Chemical Treatments for Glass | | | | | |
|---|---|---|---|---|---|---|---|
| Components | % Solids | Ill Eg 1 gm | Ill Eg 2 gm | Eg 1 gm | Eg 2 gm | Eg 3 gm | Eg 4 gm |
| total volume of | | | | | | | |

EXAMPLE 5

Another aqueous CTC for treating glass fibers was prepared for which the amounts for the components are shown below where the total volume was 100 gallons (378.5 liters). The preparation was by an order of addition as indicated by numerals and letters preceding the following materials in the stated amounts:

| | |
|---|---|
| 3A Deionized water | 150 liters |
| 3B Gamba-glycidoxypropyltrimethoxy silane (Z-6040) coupling agent | 4.18 kg |
| 3C Acetic acid | 190 grams |
| 3D Water (deionized) | 45.4 liters |
| 4A Partially amidated polyalkyleneimine cationic lubricant (Emery 6717) | 389 grams |
| 4B Water (hot) | 7.57 liters |
| 1A Aqueous dispersion of bisphenol A polyester film forming polymer Neoxil ® 954 — 47 ± 2% solids | 29.08 kg |
| 2A Aqueous emulsion of acrylic-type copolymer Rhoplex 693 emulsion (solids-50 wt %) | 7.27 kg |
| 5A SAG-10 defoamer | 4.0 ml |

The components labelled as "3" and "4" were separately mixed in a premix vessel. Components labelled as "1" and "2" were added to a main mix vessel followed by components labelled 3, 4 and 5 all with stirring. The mix was diluted to its final volume.

The aqueous CTC of Examples 1–4 were applied to glass fibers having a T-fiber diameter and the glass fibers were gathered into strands and wound onto a forming package. A plurality of strands removed from a plurality of forming packages were used in making a needled glass fiber strand mat according to the method of the preferred embodiment. The main conveyor travelled at a speed of 9.2 feet per minute ±2 feet per minute and the needler had 19 gauge needles and had penetrations per square inch of 140 and a needled penetration of 16±1 millimeter. The moisture of the mat was 1 percent maximum.

The performance of the chemically treated glass fibers for Examples 1–4 and the illustrative Examples 1 and 2 is indicated in Table 2. The performance is gauged by the number of belt wraps of the strand going into the feeder for deposition onto the moving conveyor that forms the continuous strand mat. Also, the percent moisture in the package is indicated to show whether the film of the aqueous CTC on the fibers and strand is coalesced or noncoalesced. Also indicated in the performance is the loft of the continuous strand mat that is produced from the strand, and the density of the mat is also indicated as well as its tensile. Also, processability notes of Table 2 indicate less susceptibility to temperature variations of the strands of Examples 1–4 compared to strands of Ill. Eg. 1. The better performing mat will have a lower number of belt wraps per hour and not too low or too high of a percent moisture in the package and loft and density. As seen from Table 2, the Examples 1–4 give more values corresponding to better products than the illustrative examples, even though the illustrative examples may have a few values in particular categories which are better. Hence, overall, the chemically treated glass fibers of Examples 1–4 perform better than the illustrative Examples (Ill. Eg.) 1 and 2. Also in Table 2, data are presented for the performance of a continuous strand mat that is needled in reinforcing polybutylene terephthalate (PBT). A needled mat having the aqueous CTC of the preferred embodiment produces higher flexural modulus and flexural strength and tensile strength than that of Illustrative Example 1.

TABLE 2

Performance of Chemically Treated Glass Fiber in Preparing Continuous Strand Mat Reinforcement and in PBT Laminates

| Chemically Treated Glass Fiber Strand of Table 1 | No. of Belt Wraps/Hr | % Moisture In Package | Loft In | Density Oz/Ft | Tensile | Processability Notes |
|---|---|---|---|---|---|---|
| Ill Eg (Example) 1 | 5.8 | 1.0 | 1.5 | 3.2 | 3.7 | more susceptible to temp. variation in mat formation (Tg midpt. = 20° C.) |
| Ill Eg (Example) 2 | 0 | 0.05 | 1.75–2 | 2.95 | 6.7 | more susceptible to temp. variation in mat formation (Tg midpt. = 20° C.) |
| Example 1 | 5.0 | 1.5 | 1.5 | 3.07 | 3.3 | less susceptible to temp. variation in mat formation (Tg midpt. = 25° C.) |
| Example 2 | 10.5 | 0.8 | 1.5 | 3.07 | 4.6 | less susceptible to temp. variation in mat formation (Tg midpt. room temp.) |
| Example 3 | 8.0 | 0.6 | 1.5–1.75 | 3.15 | 3.0 | less susceptible to temp. variation in mat formation (Tg midpt. room temp.) |
| Example 4 | 0 | 0.3 | 1.5 | 2.93 | 5.8 | less susceptible to temp. variation in mat formation (Tg midpt. room temp.) |

| | In Producing PBT[A] Laminates Reinforced With Mat | | |
|---|---|---|---|
| | Glass Content | Flexural Modulus (psi) | Flexural Strength (psi) | Tensile Strength (psi) |
| Ill. Eg 1[B] | 35% | $1.1 \times 10^6$ | $29.5 \times 10^3$ | $13.5 \times 10^3$ |

TABLE 2-continued

| Preferred Embodiment[B] | 35% | $1.2 \times 10^6$ | $30.6 \times 10^3$ | $16 \times 10^3$ |
| --- | --- | --- | --- | --- |

A - Valox ® PBT resin from General Electric Company
B - Both mats weighed 3 oz/ft² needled mats
Values listed are averages taken from the machine and cross-machine directions for three samples.

The laminates of Table 2 were made with the needled mat and PBT. Two plys of each were dried to have a moisture content of 0.2 percent by weight. These plys were contacted with 10 pieces of film prepared from PBT pellets dried for 6 hours at 330° F. in a positive nitrogen pressure. The laminate construction results from contacting 3 pieces of PBT film on each side of the two plys of mat and contacting three pieces of film between the mats. The laminating was conducted at a temperature of around 560° F. (293° C.) with resin temperature of 396° to 510° F. (258° C.–266° C.). The laminates were cooled at a rate of 1° to 6° F. per second after they were contacted in the heating zone for a sufficient period of time to allow the PBT to impregnate the mat. The rate of cooling allow for formation of crystals in the PET.

The laminates made in accordance with Example 1 were molded into flat panels having a size of 16 inches by 16 inches. For molding the laminates were preheated to a temperature of around 550° F. within a residence time of 4–5 minutes. These laminates were molded in a hot die mold at a temperature of 250° F. to 300° F. with a stamping tonnage of about 100 tons, a pressure of 100 to 150 tons/ft² and dwell time of 45 seconds. The strength properties of the molded panels were measured by standard ASTM tests for tensile strength, flexural strength and flexural modulus. The results are shown in Table 2 which indicate good strength properties for the molded article of the laminates with chemically treated fibers of the present invention.

Table 3 shows the isothermal thermal gravimetric analysis of cast films of aqueous CTC of illustrative Example 1, the preferred embodiment and Example 5. Also shown are cast films of the acrylic copolymer emulsion and the thermoplastic polyester emulsion. The films were cast at 38° C. for 1 day followed by heating at 110° C. for 2 hours. The Perkin Elmer Differential Scanning Calorimeter was operated to increase to a temperature of 300° C./8 minutes. Table 3 shows the improved thermal stability of the film in accordance with the present invention over that of the film of illustrative Example 1. This improved thermal property of the film translates into better performance of the film on the glass fibers used to reinforce thermoplastic polymers in a process that involves melting of the thermoplastic polymer.

TABLE 3

Isothermal Thermal Gravimetric Analysis of Cast Films

| Sample | % Weight Loss in Air |
| --- | --- |
| Ill Eg 1 | 5.62 |
| Preferred embodiment | 3.65 |
| Example 5 | 4.90 |
| Acrylic copolymer emulsion Rhoplex TR-407 | 3.74 |
| Thermoplastic polyester emulsion Neoxil 954D | 8.23 |

We claim:

1. Chemically treated glass shapes having a moisture-reduced residue as a thin surface film where the moisture-containing chemical treating composition, comprises:

a. A first water soluble, dispersible or emulsifiable film forming polymer selected from the group consisting of thermoplastic bisphenol A polyester polymers that are essentially saturated and mixtures of this polyester polymer with epoxy polymers, b. a second water soluble, dispersible or emulsifiable film forming polymer that is a self-crosslinking acrylic-type copolymer formed by addition polymerization from an acrylic-type monomer and at least one monomer that is matrix-resin miscible, selected from the group consisting of: nitrile-containing monomer and addition polymerizable epoxy-containing monomer where the second film forming polymer is compatible with the first film forming polymer, wherein based on weight percent of the solids of the aqueous chemical treating composition the total amount of the film forming polymer that is present is in the range of 65 to 90, and the amount of the first film forming polymer that is present is in the range of 55 to 70, percent by weight of the solids and the amount of the self-crosslinking acrylic-type copolymer that is present is in the range of about 10 to 20 percent by weight of the solids and where the ratio of the first film forming polymer to the second film forming polymer is in the range of around 70:30 to around 99:1 on a solids basis; and the total solids of the aqueous chemical treating composition is in the range of about 1 to about 30 weight percent, c. one or more organo silane coupling agents selected from the group consisting of: epoxy-containing organo functional silane coupling agents and amino-containing organo functional coupling agents and mixtures thereof in an effective coupling amount, d. cationic lubricant in an effective lubricating amount, and e. carrier that is water in an effective amount to allow for treatment of the glass shapes, wherein the dried residue is present on the glass fibers in an amount of about 0.1 to about 2 weight percent LOI.

2. Chemically treated glass shapes of claim 1, wherein in the chemical treating composition, the acrylic monomer is selected from the group consisting of acrylics, acrylates, alkyl acrylics, alkyl acrylates, alkylmethacrylates, hydroxyalkyl acrylates, hydroxyalkyl methacrylates and mixtures thereof.

3. Chemically treated glass shapes of claim 1, wherein in the chemical treating composition the copolymer is an acrylic-acrylonitrile copolymer having a ratio of acrylic to acrylonitrile in the range of at least one acrylonitrile monomer per polymer molecule.

4. Chemically treated glass shapes of claim 1, wherein in the chemical treating composition the water is in a predominant amount of the chemical treating composition.

5. Chemically treated glass shapes of claim 1, wherein the glass shapes with the residue have in the chemical treating composition as the thermoplastic bisphenol A polyester polymer the bisphenol A polyester film forming polymer that has the NMR curve of FIG. 1.

6. Chemically treated glass shapes of claim 5, wherein the acrylic-type copolymer is acrylic-acrylonitrile copolymer having a ratio of acrylic to acrylonitrile in the range of at least one acrylonitrile monomer per polymer molecule and the polyester and acrylic-type polymer are present in a ratio in the range of around 70 to around 99 for the polyester to around 1 to around 25 for the acrylic-type copolymer based on the solids of the total amount of both polymers in the composition.

7. Chemically treated glass shapes of claim 1, wherein the glass shapes with the residue have in the chemical treating composition an amount of organo coupling agent in the range of about 0.1 to about 1 weight percent of the aqueous chemical treating composition.

8. Chemically treated glass shapes of claim 1, wherein the cationic lubricant in the aqueous chemical treating composition is a polyamino amide lubricant made with pelargonic acid, where the lubricant is present in an amount in the range of about 0.05 to about 0.5 weight percent of the aqueous chemical treating composition.

9. Chemically treated glass shapes of claim 1, wherein the glass shapes are a plurality of continuous fibers in the form of at least one strand or bundle.

10. Chemically treated shapes of claim 1, wherein the moisture-reduced residue is in the form of non-coalesced thin surface film on coarse glass shapes resulting from removal of moisture at a temperature in the range of 130°–170° F. for 4 to 7 hours.

11. Chemically treated glass shapes of claim 1, wherein the acrylic-type copolymer has the infrared spectrophotometric curve of FIG. 2.

12. Chemically treated class shapes of claim 1, wherein the thermoplastic bisphenol A polyester polymer is present as an aqueous emulsion or dispersion of a bisphenol A polyester film forming polymer having internal emulsification through ethoxylation and having a weight average molecular weight in the range of about 30,000 to about 45,000, and the acrylic-type copolymer is present as an aqueous emulsion or dispersion of a self-crosslinking acrylic-type copolymer of at least one addition polymerizable acrylic-type monomer and at least one matrix-resin miscible monomer selected from the group consisting of nitrile-containing monomer including acrylonitrile and methacrylonitrile and $C_2$–$C_4$ nitrile containing groups, and addition polymerizable epoxy-containing monomer, where the ratio of amounts of the polyester film forming polymer to the acrylic-type copolymer is in the range of around 75:25 to around 99:1 based on the solids of the total amount of these two film forming polymers present in the chemical treating composition and wherein the total amount of film forming polymer present in the composition is in the range of 65 to 90 weight percent of the total solids of the aqueous chemical treating composition.

13. Chemically treated glass shapes of claim 1, wherein the moisture-containing chemical treating composition is essentially free of epoxy curing agents for crosslinking any epoxy-containing polymer of copolymer and of nonionic water insoluble hydrocarbon lubricants.

14. Chemically treated glass shapes of claim 1, that are glass fiber shapes and wherein the two film forming polymers results in the blend of the polymers having a glass transition temperature that is at least around room temperature.

15. Chemically treated glass fibers having a moisture-reduced residue of a chemical treating composition comprising:

a. an aqueous emulsion or dispersion of a bisphenol A polyester film forming polymer having internal emulsification through ethoxylation and having a weight average molecular weight in the range of about 30,000 to about 45,000, b. an aqueous emulsion or dispersion of a self-crosslinking acrylic-type copolymer of at least one addition polymerizable acrylic-type monomer and at least one matrix-resin miscible monomer selected from the group consisting of nitrile-containing monomer including acrylonitrile and methacrylonitrile and $C_2$–$C_4$ nitrile containing groups, and addition polymerizable epoxy-containing monomer, where the ratio of amounts of the bisphenol A polyester film forming polymer to the acrylic-type copolymer is in the range of around 75 to 25 to around 99 to 1 based on the solids of the total amount of these two film forming polymers present in the chemical treating composition and wherein the total amount of film forming polymer present in the composition is in the range of 65 to 90 weight percent of the total solids of the aqueous chemical treating composition, c. organosilane coupling agents selected from epoxy-functional, organosilane coupling agents and a mixture of epoxy-functional and amino-functional organosilane coupling agents present in an amount of around 2 to around 35 weight percent of the solids of the aqueous chemical treating composition, d. polyamino amide cationic lubricant which is a partially amidated polyalkylene amine prepared through condensation with fatty acids where at least one of the fatty acids is pelargonic acid present in an amount of around 1 to around 6 weight percent of the solids of the aqueous chemical treating composition, and e. water in an amount to give a total solids of the aqueous chemical treating composition in the range of about 1 to about 20 weight percent, wherein the dried residue is present on the glass fibers in an amount of about 0.1 to about 2 weight percent LOI.

16. Chemically treated glass fibers of claim 15, wherein the moisture-reduced residue is present as a non-coalesced film on coarser fibers resulting from moisture-reduction of the aqueous chemical treating composition on the fibers at a temperature in the range of 130°–170° F. for 4 to 6 hours.

17. Chemically treated glass fibers of claim 15, present in the form of continuous glass fibers, strands, bundles and continuous glass fiber strand mats, bonded mats and needled mats.

18. Chemically treated glass fibers of claim 13, wherein the aqueous emulsion or dispersion of the bisphenol A polyester film forming polymer is present in an amount of 55 to 70 percent of the solids of the aqueous chemical treating composition and the amount of the self-crosslinking acrylic-type copolymer is present in an amount in the range of about 10 to 20 weight percent of the solids of the aqueous chemical treating composition.

19. Chemically treated glass fibers of claim 15, wherein the acrylic monomer is selected from the group consisting of acrylates, alkyl acrylics, alkyl acrylates, alkylmethacrylates, hydroxyalkyl acrylates, hydroxyalkyl methacrylates and mixtures thereof.

20. Chemically treated glass fibers of claim 15, wherein the chemical treating composition also has a defoaming agent present in the effective amount to retard foaming of the chemical treating composition.

21. Mat of glass fiber strands, wherein the continuous fibers of the strands have a chemical treatment, comprising:
   a. a first water soluble, dispersible or emulsifiable film-forming polymer selected from the group consisting of thermoplastic bisphenol A polyester polymers and mixtures of this polymer with epoxy polymers,
   b. a second water soluble, dispersible or emulsifiable film forming polymer that is a copolymer formed by addition polymerization from an acrylic-type monomer and at least one monomer that is matrix-resin compatible, selected from the group consisting of: nitrile-containing monomer and addition polymerizable epoxy-containing monomer where the second film forming polymer is compatible with the first film forming polymer and where the ratio of the first film forming polymer to the second film forming polymer is in the range of around 1:1 to around 99:1 on a solids basis,
   c. one or more organo silane coupling agents selected from the group consisting of: epoxy-containing organo functional silane coupling agents and amino-containing organo functional coupling agents and mixtures thereof in an effective coupling amount,
   d. cationic lubricant in an effective lubricating amount, and
   e. carrier in an effective amount to allow for treatment of the glass fibers and wherein the mat is a bonded mat selected from the group consisting of mechanically bonded mats, needled mats, and chemically bonded mats.

22. Chemically treated continuous glass fibers in the form of a needled mat wherein the chemical treatment on the glass fibers is a moisture-reduced residue of a chemical treating composition, comprising:
   a. an aqueous emulsion or dispersion of a bisphenol A polyester film forming polymer having the NMR curve of FIG. 1 and having internal emulsification and having a weight average molecular weight in the range of about 30,000 to about 45,000, constituting the major portion of the solids of the aqueous chemical treating composition,
   b. an aqueous emulsion or dispersion of a self-crosslinking acrylic-type copolymer of at least one addition polymerizable acrylic-type monomer selected from the group consisting of acrylics, acrylates, alkyl acrylics, alkylacrylates, alkylmethacrylates, hydroxy alkylacrylates, hydroxy alkylmethacrylates, and mixtures thereof and at least one matrix resin miscible monomer selected from the group consisting of nitrile-containing monomer that is selected from the group consisting of: acrylonitrile and methacrylonitrile and $C_2$–$C_4$ nitrile containing groups including the copolymer as depicted in FIG. 2 and addition polymerizable epoxy-containing monomer wherein the ratio of amounts of the bisphenol A polyester film forming polymer to the acrylic-type copolymer is in the range of around 70 to 30 to around 95 to 5 based on the solids of the total amount of the two film forming polymers present in the chemical treating composition, and wherein the total amount of the film forming polymer present in the composition is in the range of 70 to 85 percent of the aqueous chemical treating composition.
   c. gammaglycidoxypropyltrimethoxy silane coupling agent present in an amount of around 2 to around 35 weight percent of the solids of the aqueous chemical treating composition,
   d. polyamino amide cationic lubricant which is a partially amidated polyalkylene amine prepared through condensation with fatty acids, where at least one of the fatty acids is pelargonic acid in an amount of around 1 to around 6 weight percent of the solids of the aqueous chemical treating composition, and
   e. water in an amount to give a total solids of the aqueous chemical treating composition in the range of about 1 to about 20 weight percent wherein the amount of the dried residue of the aqueous chemical treating composition is in the range of about 0.1 to about 2 weight percent LOI of the glass strands, and
   f. an effective amount of antifoaming agent.

* * * * *

UNITED STATES PATENT AND TRADEMARK OFFICE
CERTIFICATE OF CORRECTION

PATENT NO. : 5,141,802
DATED : August 25, 1992
INVENTOR(S) : Luciano M. Parrinello and Narasimhan Raghupathi It is certified that error appears in the above-indentified patent and that said Letters Patent is hereby corrected as shown below:

Claim 1, column 18, line 27, delete "," after 70; line 28, insert --,-- after the word solids; line 34, delete ";" after the word basis and insert --,--.

Claim 12, column 19, line 32, delete the word "class" and insert --glass--.

Claim 13, column 19, line 58, delete the word "of" and insert --or--.

Claim 20, column 21, line 1, delete the word "the" and insert --an--.

Claim 22, column 22, line 25, delete "." after the word composition and insert --,--.

Signed and Sealed this

Twenty-seventh Day of August, 1996

Attest:

BRUCE LEHMAN

Attesting Officer

Commissioner of Patents and Trademarks